Patented Mar. 7, 1950

2,499,932

UNITED STATES PATENT OFFICE 2,499,932

PLASTICIZED POLYAMIDE COMPOSITIONS

George R. Sido, Springfield, Mass., assignor to Monsanto Chemical Company, St. Louis, Mo., a corporation of Delaware No Drawing. Application November 24, 1947,
Serial No. 787,861

8 Claims. (Cl. 260—30.8)

This invention relates to plasticized compositions comprising synthetic linear polyamides. More particularly, the invention relates to plasticized compositions comprising synthetic linear polyamides and the reaction products of alcohols with N-alkylol aryl sulfonamides.

It is well known that the simple polyamides formed by the polymerization of a single diamine and a single dicarboxylic acid have very high melting and softening points. They are extremely difficult to plasticize due to their physical properties, their lack of compatibility with materials used as plasticizers for other resins such as polyvinyl chloride, cellulose esters, etc., and their lack of solubility in solvents which are relatively inert chemically.

On the other hand, synthetic linear polyamides, formed by the interreaction and polymerization of three, four or more amide-forming components have lower melting and softening points and exhibit greater compatibility with known plasticizers. While these polyamides made from at least three amide-forming components have been formed into sheets and films of excellent clarity and somewhat improved flexibility compared to sheets and films prepared from simple polyamides, there is still much to be desired for many uses which require even greater pliability and flexibility.

The polyamides are extremely difficult to plasticize even with compounds which are compatible. If temperatures above their softening or melting points are used, they tend to break down and discolor unless the process is carried out in an atmosphere of inert gas such as carbon dioxide or nitrogen. Moreover, even at temperatures above their softening points, the polyamides have poor workability and offer extreme resistance to processing on conventional equipment such as roll mills, calenders, Banbury mixers, extruders, etc., and in particular, it is extremely difficult to remove the plasticized polyamide compositions from the rolls to form sheeted compositions. Even the few compounds which are compatible and which are plasticizers, have not markedly improved the workability of the polyamides.

It is an object of this invention to provide new plasticized compositions comprising polyamides and a plasticizer which is truly compatible therewith.

A further object is to provide plasticized polyamide compositions which have improved workability on conventional plastic composition processing and handling equipment such as ball mills, roll mills, calenders, Banbury mixers, extruders, etc.

These and other objects are attained by incorporating in polyamide resins the reaction products of alcohols with N-alkylol aryl sulfonamides.

Easily plasticizable resins, such as polyvinyl chloride, go through three distinct stages upon heating under gradually increasing temperatures, namely, a more or less rigid stage, an elastomeric stage and, finally, a molten stage. Incorporation of plasticizers, pigments and fillers into the plastic compositions usually takes place at some interval during the elastomeric stage, preferably just below the melting point, at which point the compositions are easily workable into homogeneous compositions.

However, with the nylon-type polyamide resins, there is apparently only a very narrow elastomeric stage, the resins seemingly going almost directly from the more or less tough unfused stage to a highly viscous, tacky molten stage which offers extreme resistance to the shearing action of the rolls of a roll mill. Moreover, this very narrow elastomeric stage makes it extremely difficult to form sheets from compositions which are being worked on roll mills. If one attempts to apply the doctor knife to the roll while the composition is in the tacky, viscous stage, very poor sheets are formed, and upon cooling the roll, if the sheet is not removed during the narrow elastomeric range, then the polyamide composition becomes so tough that the sheets are extremely difficult to cut from the roll. The incorporation of the alcohol derivatives of N-alkylol aryl sulfonamides with the nylon-type polyamide resins results in compositions having very definite elastomeric stages, during which time the compositions are easily worked and which compositions are easily removable from the rolls. Other materials, such as the aryl sulfonamides which are commonly accepted by those skilled in the art as being the best plasticizers for polyamide compositions, do not give compositions having the degree of workability or the well defined and elastomeric stage such as is experienced when the alcohol derivatives of N-alkylol aryl sulfonamides are used as the plasticizer for the polyamide composition.

The polyamide resins when plasticized with the alcohol derivatives of N-alkylol aryl sulfonamides, in addition to having the increased workability, have greater permanence of plasticizer and better heat stability than do the polyamide compositions plasticized with the commonly used aryl sulfonamides.

The following examples are given in illustration and are not intended as limitations on the scope of this invention. Where parts are mentioned, they are parts by weight.

Example I

A filament prepared from polyhexamethylene adipamide by conventional means was immersed for about 5 hours in an ethanol solution containing about 20% by weight of the reaction product of butanol with N-methylol p-toluene sulfonamide. The filament was then removed from the solution and air dried at about 100° C. until all traces of ethanol were removed. The sample showed an increase in weight of about 15% and was unchanged in physical appearance, i. e., it was still clear and bright. The treated filament could be cold drawn more easily than the untreated filament and the drawn product was more flexible than that drawn from untreated filament.

Similar results were obtained when the methanol and the 2-ethyl hexanol derivatives of N-methylol p-toluene sulfonamide were substituted for the butanol derivative.

Example II 75 parts of a four component polyamide resin prepared by the condensation polymerization of 60 parts of hexamethylene diammonium adipate and 40 parts of decamethylene diammonium sebacate and having a melting point of 165° C. were intimately mixed with 25 parts of the reaction product of 2-ethyl hexanol with N-methylol toluene sulfonamide. This mixture was worked on a two-roll differential speed roll mill wherein the hotter roll was maintained at 175° C. until the mixture was fluxed and a homogeneous composition had formed. After the fluxing was complete, the rolls were gradually cooled, a doctor knife applied to the roll, and the plasticized composition was easily and smoothly sheeted off the roll. The composition was processed and was handled as easily and smoothly as if the composition had been a plasticized polyvinyl chloride composition, which compositions are well known for their extreme ease of workability.

The low temperature flexibility point of this composition was determined to be 22° C. as compared with a low temperature flexibility of 28° C. for the unplasticized polyamide resin. The sample lost only 5.2% of its weight during 24 hours at 105° C. and can, therefore, be rated as having a high permanence of plasticizer. Moreover, the sample developed only a very light yellow coloration after the prolonged heating in the oven, which is evidence of excellent heat stability.

The low-temperature flexibility, the permanence of the plasticizer and the heat stability of the compositions were determined by methods well known to persons skilled in the art of plasticizing resinous compositions. In detail: the low-temperature flexibility points were determined by the method described by Clash and Berg in Ind. Eng. Chem. 34, 1218 (1942); the permanence of plasticizer was evaluated by placing 2" circular discs of 40 mils thickness in a forced draft circulating oven for 24 hours at 105° C. and then determining the loss in sample weight due to loss of plasticizer; the heat stability was evaluated by comparing the color and general appearance of the sample before and after the heat treatment at 105° C.

Example III 75 parts by weight of the four component polyamide resin of Example II, a hexamethylene adipamide-decamethylene sebacamide interpolymer, was intimately mixed with 25 parts by weight of toluene sulfonamide. This mixture was worked on a roll mill under identical conditions as those of Example II and it was observed that this composition was processed only with extreme difficulty and, moreover, when subjected to the permanence of plasticizing tests, the sample lost 38.8% of its weight as compared with a 5.2% loss when the 2-ethyl hexyl derivative of N-methylol toluene sulfonamide was used as the plasticizer in Example II. In addition, the composition of Example III had a dark yellow coloration following the oven test and was substantially inferior in heat stability to the composition of Example II.

Example IV 75 parts by weight of a four component polyamide resin, a hexamethylene adipamide-decamethylene sebacamide interpolymer prepared by the condensation polymerization of 41.2 parts by weight of hexamethylene diammonium adipate and 58.8 parts by weight of decamethylene diammonium sebacate and having a melting point of 140° C., were intimately mixed with 25 parts by weight of the reaction product of n-propanol with N-methylol toluene sulfonamide. This mixture was easily worked on a two-roll differential speed roll mill wherein the hotter roll was maintained at 155° C. until a homogeneous composition was formed. This composition was then sheeted off the roll mill and molded into sheets of 40 mil. thickness for further evaluation. The molded sheets resembled an unplasticized nylon-type polyamide resin in many respects, particularly in toughness and clarity. However, the molded sheets had increased flexibility and, of more importance, this composition rolled and fluxed very easily and smoothly so that a homogeneous composition was formed on the roll mill and the composition was sheeted off the roll with very little difficulty. The permanence of the plasticizer, as determined by the circulating oven test, was 6.4% loss of plasticizer and the composition had an excellent heat stability as evidenced by the fact that the composition retained its light yellow coloration throughout the oven test.

Example V 50 parts by weight of a four component polyamide resin, a hexamethylene adipamide-heptamethylene pimelamide interpolymer prepared by the condensation polymerization of 50 parts by weight of hexamethylene diammonium adipate and 50 parts by weight of heptamethylene diammonium pimelate and having a melting point of 155° C., were intimately mixed with 50 parts by weight of the 2-ethyl hexyl derivative of N-methylol toluene sulfonamide. This mixture was easily worked on a two-roll differential speed roll mill wherein the hotter roll was maintained at 170° C. The mixture worked very smoothly and easily until a homogeneous composition had formed at which time the sheet was easily cut from the roll. This plasticized composition evidenced a low temperature flexibility of 14° C., a 2.6% loss of plasticizer in the circulating oven and evidenced very good heat stability due to the fact that the sample developed only a very slight yellow coloration during the heating in the oven.

Example VI 100 parts by weight of a four component polyamide resin, hexamethylene adipamide-nonamethylene azelamide prepared by the condensation polymerization of 50 parts by weight of nonamethylene diammonium azelate and 50 parts by weight of hexamethylene diammonium adipate and having a melting point of 147° C., were intimately mixed with 20 parts by weight of the n-propanol derivative of N-methylol toluene sulfonamide. This mixture was worked on a roll mill wherein the hotter roll was maintained at 160° C. and it was observed that the rolling operation progressed very easily and smoothly and, in addition, the sheets of plasticized material were quite easily removed from the rolls.

Example VII 75 parts by weight of a three component polyamide resin, a 6-amino caproic acid-decamethylene diamine-sebacic acid condensation copolymer prepared by the condensation polymerization of 60 parts by weight of 6-amino caproic acid and 40 parts by weight of decamethylene diammonium sebacate and having a melting point of 142° C. were intimately mixed with 25 parts by weight of the 2-ethyl hexyl derivative of N-methylol toluene sulfonamide. This mixture was easily worked on a two-roll differential speed roll mill wherein the hotter roll was maintained at 160° C. until a homogeneous composition was formed. This composition was then easily sheeted off the roll mill.

The compositions of Examples II and IV through VII could be comminuted and then molded by compression, injection or extrusion methods without difficulty. They could also be easily cold drawn to provide articles of high strength, toughness and flexibility.

When other alcohol derivatives of N-alkylol aryl sulfonamides such as the methyl and butyl derivatives of N-methylol toluene sulfonamide, the ethyl derivative of N-methylol benzene sulfonamide, and the butyl derivative of N-ethylol toluene sulfonamide were substituted for the plasticizers shown in the examples, similar results were obtained.

The polyamides which may be plasticized by the particular compounds of this invention are the synthetic linear polymers prepared by condensing and polymerizing together compounds containing two or more amide-forming groups. Thus, the simplest, highest melting, most crystalline and most difficult to plasticize polyamides are prepared by condensing and polymerizing together an organic diamine and an organic dicarboxylic acid or by polymerizing an amino carboxylic acid or an anhydride thereof such as caprolactam. Examples of the simple polyamides which may be plasticized by the compositions of this invention are the polymers of hexamethylene adipamide, hexamethylene sebacamide, nonamethylene adipamide, decamethylene carbamide, 6-aminocaproic acid, 11-amino undecanoic acid, etc. These polyamides are particularly difficult to plasticize due to their extremely high and sharp melting points and, as a result, special methods must be employed, such as that shown in Example I or by melting the polyamide and mixing a stream of the molten polymer with a stream of the plasticizer.

More easily plasticized are the polyamides derived from three and four or even more amide-forming components and it is these polyamides which constitute the preferred embodiment of this invention.

The polyamides most suitable for incorporation into the novel compositions of this invention are those nylon-type polyamide resins formed by the copolymerization, as described in U. S. Patent 2,252,554, of at least four different amide-forming reactants, at least one of which is a diprimary diamine and at least one other of which is a dicarboxylic acid or an amide-forming derivative of a dibasic carboxylic acid. The other two polyamide-forming reactants may be selected from diprimary diamines different from the first selected diprimary diamine, dicarboxylic acids or amide-forming derivatives of dibasic carboxylic acids different from the first selected dicarboxylic acids or amide-forming derivatives of dibasic carboxylic acid, diamines having at least one hydrogen atom on each amino group, polymerizable monoamino carboxylic acids and amide-forming derivatives of monoamino carboxylic acids, including caprolactam. For the purposes of describing the nylon-type polyamides particularly suitable for the plasticized compositions of this invention, a salt of a diamine and a dibasic acid is considered as representing two polyamide-forming reactants. The amide and acid polyamide-forming reactants are used in substantially equal molecular amide-forming proportions. By substantially equal molecular amide-forming proportions is meant that not more than 5 mol per cent excess of either amino or acid amide-forming functional groups are employed, that is, the reaction mixture must not contain substantially more than 5 mol per cent excess of either amino or acid amide-forming groups or their equivalents.

The plasticizers of this invention are derived from alcohols and N-alkylol aryl sulfonamides. They are described and a method for preparing them from aryl sulfonamides, aldehydes and alcohols is described in my co-pending application Ser. No. 776,627. The N-alkylol aryl sulfonamides may be prepared by reacting aryl sulfonamides with aldehydes under alkaline conditions, or with halohydrins under conditions which split off hydrogen halide, or by other means for introducing an alkylol group into an amine or amide group. When produced from an aldehyde, the compounds may contain on the average from 0.5 to 1.5 alkylol groups per sulfonamide group and they may be monomeric or partially polymerized to dimers, trimers, etc.

By whatever means they are prepared, the N-alkylol aryl sulfonamides are reacted with an alcohol under acidic conditions to produce the plasticizers of this invention. The amount of alcohol used should be at least equivalent on the basis of the number of functional (alcoholic hydroxyl) groups to the number of alkylol groups. Preferably a large excess of alcohol is used to act as a solvent medium for the reaction and the reaction products.

The exact nature of the reaction products has not been fully determined. They appear to be ethers of N-alkylol aryl sulfonamides and have some properties which are characteristic of ethers. However, there is some possibility that polymerization or condensation may take place to a minor extent resulting in a much more complex molecule than that of a simple ether. As a matter of convenience, the plasticizers are claimed as ethers with the intent to cover the materials prepared as described above.

The alcohols used may be aliphatic, aromatic, cycloaliphatic or heterocyclic. In the case of the aliphatic alcohols, they may be straight chain or branched chain alcohols. Among the alcohols which may be used are methanol, ethanol, propanol, isopropanol, butanol, isobutanol, 2-ethyl hexanol, n-octanol, lauryl alcohol, stearyl alcohol, cetyl alcohol, benzyl alcohol, cyclohexanol, cyclopentanol, furfuryl alcohol, etc.

The aryl sulfonamides which may be used are benzene sulfonamide and the ring-substituted derivatives thereof such as toluene, xylene, chlorobenzene, nitro benzene, ethyl benzene, etc., sulfonamides.

The plasticizers of this invention vary from viscous high boiling liquids to waxy solids. They are, in general, colorless when liquid and pure white when solid. They are particularly advantageous as plasticizers due to their excellent stability to heat and light, their low volatility and their solubility in a wide range of solvents.

They may be employed in quantities ranging from about 1 to about 100 parts per 100 parts of polyamide resin depending upon the type of resin and the use for which the plasticized composition is intended. For example, it may be required to improve the cold drawing properties of two component polyamides without substantially softening the resin. 1 part of the 2-ethyl hexyl derivative of N-methylol-p-toluene sulfonamide absorbed by 100 parts of the resin by the method shown in Example I is sufficient to materially increase the cold drawing properties of the resin without softening it to too great an extent.

Substantially improved plasticized polyamide compositions having increased workability and, therefore, suitable for roll milling, may be prepared by incorporating the alcohol derivatives of N-alkylol aryl sulfonamides with the three or four or more component polyamides as hereinbefore described in the ratio of 15 to 100 parts by weight of the alcohol derivatives of N-alkylol aryl sulfonamides per 100 parts by weight of the selected polyamides. However, for most roll milling operations we have found that compositions prepared in the ratio of 20 to 50 parts of the alcohol derivatives of N-alkylol aryl sulfonamides per 100 parts of the selected polyamide resins have the preferred combination of characteristics such as ease of workability, permanence of plasticizer and heat stability.

A variation on the roll milling process which may be employed with successful results using the same range of compositions is the hot calendering method using three or more calender rolls. Sheets obtained by this process are smooth, flexible, uniform in thickness and well suited for such applications as wrapping or packaging.

These compositions comprising the alcohol derivatives of N-alkylol aryl sulfonamides and the described polyamides may also be advantageously used as molding compositions, in which instances it has been found that 15 to 35 parts by weight of the alcohol derivatives of N-alkylol aryl sulfonamides per 100 parts of the selected polyamide resins result in molding compositions of good heat stability, permanence of plasticizer and excellent molding characteristics.

The plasticized compositions of this invention may further be extruded in conventional screw or hydraulic ram machines through dies of widely varying shapes. In general, for the extrusion process larger amounts of plasticizer are needed and the shapes produced are somewhat softer than articles produced by the molding or rolling techniques. Polyamide resins containing from 15 to 100 parts of plasticizer per 100 parts of resin may be successfully extruded.

In addition to the above methods of incorporating the plasticizers into the polyamide resins, the incorporation may be effected by ball milling the ingredients or mixing them in standard mixing equipment such as Banbury or dough type mixers. Such operations may result in mechanical mixing without colloiding and may require further treatment such as roll milling, calendering, extrusion, compression or injection molding, etc. Furthermore, the plasticizers may be dissolved in a common solvent for the polyamides, mixed with the solvent soluble polyamide resins and then worked by any of the processes described above.

Finally the plasticizers may be dissolved in a non-solvent for the polyamide resins and then impregnated into the resins by a soaking process followed by elimination of the non-solvent.

Various conventional ingredients such as synthetic and natural resins, dyes, pigments, fillers, lubricants, etc., may be incorporated into the plasticized compositions during the milling, calendering or extrusion operations.

It is obvious that many variations may be made in the processes and products of this invention without departing from the spirit and scope thereof as defined in the appended claims.

What is claimed is:

1. A plasticized composition comprising a synthetic linear polyamide obtained by the condensation polymerization of an organic diamine and an organic dicarboxylic acid and a reaction product under acidic conditions of an alcohol with an N-alkylol aryl sulfonamide in which the sulfonamide group is directly attached to a benzene ring.

2. A plasticized composition comprising a polyamide resin which is the reaction product of at least 4 different amide-forming reactants, in substantially equal molecular amide-forming proportions, at least one of which is a diprimary diamine and at least one other of which is selected from a dicarboxylic acid and amide-forming derivatives of a dibasic carboxylic acid, the other two polyamide-forming reactants being selected from diprimary diamines different from the first selected diprimary diamines and dicarboxylic acids and amide-forming derivatives of dibasic carboxylic acids different from the first selected dicarboxylic acid or amide-forming derivatives of dibasic dicarboxylic acids and a reaction under acidic conditions of an alcohol with an N-alkylol aryl sulfonamide in which the sulfonamide group is directly attached to a benzene ring.

3. A plasticized composition as in claim 2 wherein the plasticizer is a reaction product under acid conditions of 2-ethyl hexyl alcohol with N-methylol toluene sulfonamide.

4. A plasticized composition as in claim 2 wherein the plasticizer is a reaction product under acid condition of n-propyl alcohol with N-methylol toluene sulfonamide.

5. A plasticized composition as in claim 2 wherein the plasticizer is a reaction product under acid conditions of n-butyl alcohol with N-methylol toluene sulfonamide.

6. A plasticized composition comprising a reaction product under acid conditions of 2-ethyl hexyl alcohol with N-methylol toluene sulfonamide and a synthetic linear polyamide formed by the condensation polymerization of hexamethylene diamine, decamethylene diamine, adipic acid and sebacic acid in substantially equal molecular amide-forming proportions.

7. A plasticized composition comprising a synthetic linear polyamide which is the reaction product of a plurality of amide-forming reactants, at least one of which is an organic diamine and at least one other of which is an organic dicarboxylic acid, and a reaction product under acid conditions of an alcohol with an N-alkylol aryl sulfonamide in which the sulfonamide group is directly attached to a benzene ring.

8. A plasticized composition comprising 100 parts of a synthetic linear polyamide which is the reaction product of a plurality of amide-forming reactants, at least one of which is an organic diamine and at least one other of which is an organic dicarboxylic acid, and from 1 to 100 parts of a reaction product under acid conditions of an alcohol with an N-alkylol aryl sulfonamide in which the sulfonamide group is directly attached to a benzene ring.

GEORGE R. SIDO.

REFERENCES CITED

The following references are of record in the file of this patent:

UNITED STATES PATENTS

| Number | Name | Date |
|---|---|---|
| 2,244,183 | Austin | June 3, 1941 |
| 2,366,494 | D'Alelio | Jan. 2, 1945 |